United States Patent
Wachsman et al.

(10) Patent No.: US 12,281,911 B2
(45) Date of Patent: Apr. 22, 2025

(54) END OF ROUTE NAVIGATION SYSTEM

(71) Applicant: Uber Technologies, Inc., San Francisco, CA (US)

(72) Inventors: Eleanor Cady Wachsman, San Francisco, CA (US); Yulei Wang, San Francisco, CA (US); Robin Carol Tolochko, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 90 days.

(21) Appl. No.: 17/446,906

(22) Filed: Sep. 3, 2021

(65) Prior Publication Data
US 2022/0074759 A1    Mar. 10, 2022

Related U.S. Application Data

(60) Provisional application No. 62/706,725, filed on Sep. 4, 2020.

(51) Int. Cl.
G01C 21/36    (2006.01)
G01C 21/34    (2006.01)
(Continued)

(52) U.S. Cl.
CPC ..... *G01C 21/3667* (2013.01); *G01C 21/3476* (2013.01); *G08G 1/096844* (2013.01); *G08G 1/0969* (2013.01)

(58) Field of Classification Search
CPC ............ G01C 21/3667; G01C 21/3476; G08G 1/096844; G08G 1/0969
(Continued)

(56) References Cited

U.S. PATENT DOCUMENTS

| 6,282,493 B1 * | 8/2001 | Kitagawa | G01C 21/3682 701/465 |
| 6,430,500 B1 * | 8/2002 | Kubota | G01C 21/3617 701/425 |

(Continued)

FOREIGN PATENT DOCUMENTS

| CN | 108088450 A * | 5/2018 | ........... G01C 21/343 |
| EP | 2995909 A1 * | 3/2016 | ......... G01C 21/3605 |

(Continued)

OTHER PUBLICATIONS

D. Fagan and R. Meier, "Intelligent time of arrival estimation," 2011 IEEE Forum on Integrated and Sustainable Transportation Systems, Vienna, Austria, 2011, pp. 60-66, doi: 10.1109/FISTS.2011.5973595. (Year: 2011).*

(Continued)

*Primary Examiner* — Marc Burgess
*Assistant Examiner* — Merritt E Levy
(74) *Attorney, Agent, or Firm* — Schwegman Lundberg & Woessner, P.A.

(57) ABSTRACT

Example embodiments are directed to systems and methods for providing end of route navigation. A network system identifies a destination of a route and retrieves a display template based on the destination. The display template provides guidelines for display of end of route content, whereby the display of the end of the route content is different than display of content during a middle of the route. Based on the display template, a display time to trigger display of the end of the route content. The display time may be associated with a threshold distance to the destination. The network system monitors a location of a vehicle along the route and accesses end of route content. Responsive to detecting that the location of the vehicle is at the threshold (Continued)

distance to the destination, the end of the route content is displayed on a device associated with the vehicle.

20 Claims, 5 Drawing Sheets

(51) Int. Cl.
*G08G 1/0968* (2006.01)
*G08G 1/0969* (2006.01)

(58) Field of Classification Search
USPC .......................................................... 701/432
See application file for complete search history.

(56) References Cited

U.S. PATENT DOCUMENTS

| | | | | |
|---|---|---|---|---|
| 10,126,138 | B1* | 11/2018 | Farmer | G01C 21/3423 |
| 2005/0090974 | A1* | 4/2005 | Hirose | G01C 21/3691 |
| | | | | 340/995.13 |
| 2010/0302056 | A1* | 12/2010 | Dutton | H04W 4/02 |
| | | | | 340/8.1 |
| 2011/0137907 | A1* | 6/2011 | Ikenoue | G06F 16/29 |
| | | | | 707/E17.089 |
| 2012/0303270 | A1* | 11/2012 | Su | G01C 21/3626 |
| | | | | 701/431 |
| 2013/0158866 | A1* | 6/2013 | Weir | G01C 21/3617 |
| | | | | 701/468 |
| 2013/0325321 | A1* | 12/2013 | Pylappan | G01C 21/20 |
| | | | | 701/410 |
| 2013/0326384 | A1* | 12/2013 | Moore | G01C 21/3664 |
| | | | | 715/771 |
| 2014/0078022 | A1* | 3/2014 | Dusterhoff | G06F 3/1454 |
| | | | | 345/3.1 |
| 2014/0107894 | A1* | 4/2014 | Obradovich | B60W 10/184 |
| | | | | 701/49 |
| 2014/0278051 | A1 | 9/2014 | Mcgavran et al. | |
| 2014/0365126 | A1* | 12/2014 | Vulcano | G01C 21/3679 |
| | | | | 701/538 |
| 2014/0372036 | A1* | 12/2014 | Lehtiniemi | G06Q 30/0205 |
| | | | | 701/538 |
| 2015/0058462 | A1* | 2/2015 | Tafel | G06F 16/44 |
| | | | | 709/223 |
| 2016/0132476 | A1* | 5/2016 | Scholler | G06F 9/451 |
| | | | | 715/202 |
| 2016/0180500 | A1* | 6/2016 | Barnes | G09B 29/004 |
| | | | | 345/646 |
| 2016/0358471 | A1* | 12/2016 | Hajj | G01C 21/3667 |
| 2017/0176208 | A1* | 6/2017 | Chung | H04N 21/85 |
| 2017/0307396 | A1* | 10/2017 | So | G01C 21/3484 |
| 2018/0022290 | A1* | 1/2018 | Feldman | B60R 11/0229 |
| | | | | 348/115 |
| 2020/0041301 | A1* | 2/2020 | Jalasutram | H04W 4/021 |
| 2020/0080865 | A1* | 3/2020 | Ervin | G01C 21/3667 |
| 2022/0343597 | A1* | 10/2022 | Moore | G06T 15/20 |

FOREIGN PATENT DOCUMENTS

| | | | | |
|---|---|---|---|---|
| EP | 3081904 | | 10/2016 | |
| EP | 3081904 | A2 * | 10/2016 | G01C 21/362 |
| WO | WO-2009098030 | A2 * | 8/2009 | G01C 21/3682 |
| WO | 2016168678 | | 10/2016 | |
| WO | WO-2016168678 | A1 * | 10/2016 | G01C 21/20 |
| WO | 2022051774 | | 3/2022 | |

OTHER PUBLICATIONS

"Providing Context and Dynamic Fine Tuning of Automobile Satellite Navigation Destinations", IP.com, IPCOM000243736 D, Oct. 2015. (Year: 2015).*

O. Anya, H. Tawfik and A. Nagar, "Towards Multi-Perspective Intelligent Layout Design for Context-Driven Route Navigation," 2008 Second UKSIM European Symposium on Computer Modeling and Simulation, Liverpool, UK, 2008, pp. 400-405, doi: 10.1109/EMS.2008.82. (Year: 2008).*

"International Application Serial No. PCT US2021 071370, Invitation to Pay Additional Fees mailed Dec. 20, 2021", 11 pgs.

"International Application Serial No. PCT US2021 071370, International Search Report mailed Feb. 11, 2022", 6 pgs.

"International Application Serial No. PCT US2021 071370, Written Opinion mailed Feb. 11, 2022", 11 pgs.

"International Application Serial No. PCT US2021 071370, International Preliminary Report on Patentability mailed Mar. 16, 2023", 13 pgs.

"Australian Application Serial No. 2021337005, First Examination Report mailed Jan. 31, 2024", 3 pgs.

"Australian Application Serial No. 2021337005, Response filed Jul. 1, 2024 to First Examination Report mailed Jan. 31, 2024", 16 pgs.

"Canadian Application Serial No. 3,191,514, Examiners Rule 86(2) Requisition mailed Aug. 14, 2024", 4 pgs.

"Australian Application Serial No. 2021337005, Subsequent Examiners Report mailed Aug. 6, 2024", 5 pgs.

* cited by examiner

END OF ROUTE NAVIGATION SYSTEM

RELATED APPLICATIONS

This application is related to and hereby claims the priority benefit of U.S. Provisional Patent Application No. 62/706,725 filed Sep. 4, 2020, titled "End of Route Navigation System," which is incorporated herein by reference in its entirety.

TECHNICAL FIELD

The subject matter disclosed herein generally relates to special-purpose machines configured for causing display of map content, and to the technologies by which such special-purpose machines become improved compared to other machines that cause display of map content. Specifically, the present disclosure addresses systems and methods that provides context related map content at an end of a route to a destination.

BACKGROUND

Conventionally, pickup is the most daunting and ongoing problem for transportation companies (e.g., ridesharing companies). It is consistently the most frustrating part of the transportation experience and often leads to cancellations and/or altercations between a rider and a driver. Additionally, pickup can be a more stressful and less straightforward time for drivers compared to the middle of trips. Drivers need to look for riders, find a safe place to pull over, and watch out for traffic all at the same time.

BRIEF DESCRIPTION OF THE DRAWINGS

Some embodiments are illustrated by way of example and not limitation in the figures of the accompanying drawings.

DETAILED DESCRIPTION

Figure 1:
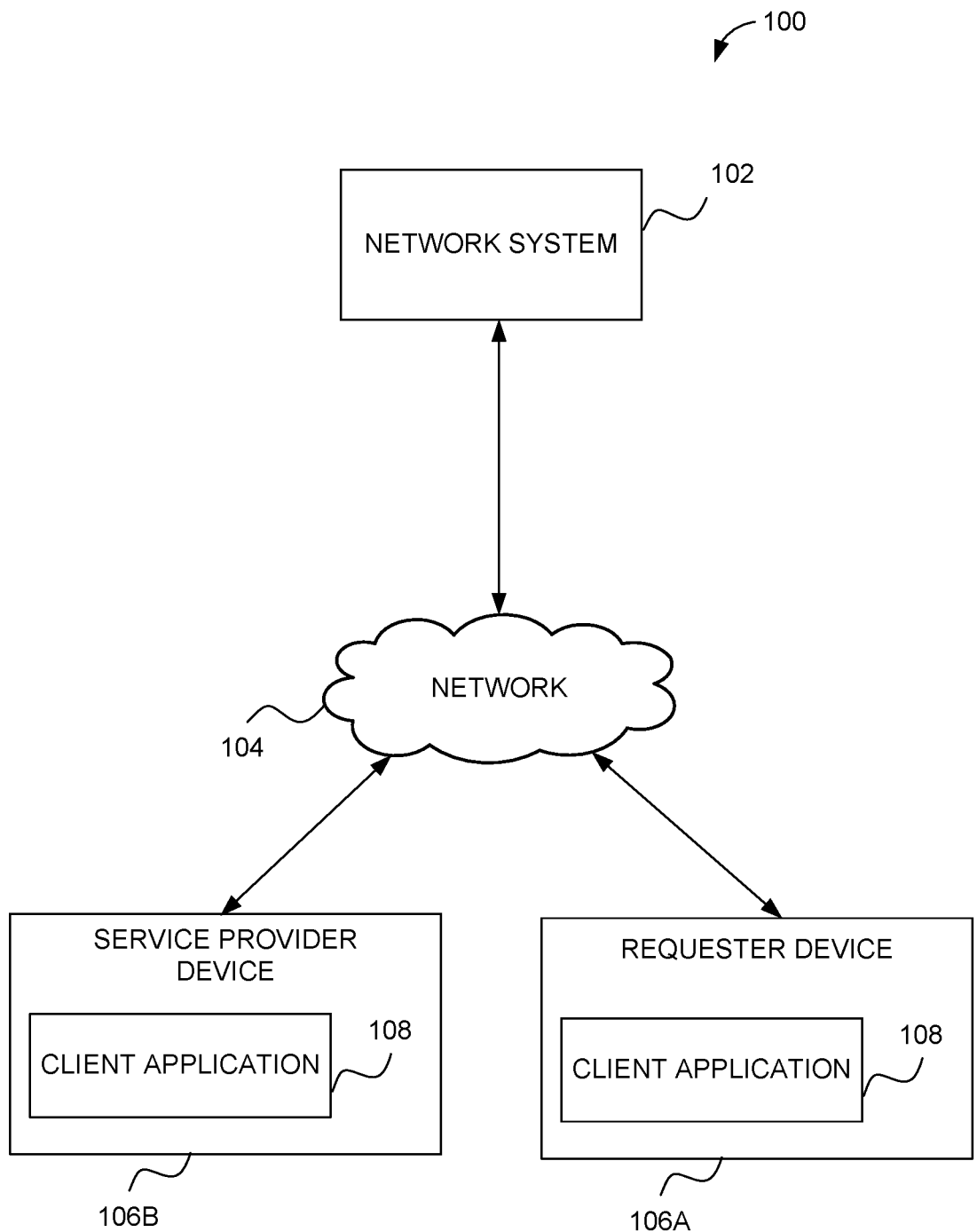
FIG. 1 is a diagram illustrating a network environment suitable for providing context related map content at an end of a route, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Conventionally, a consumer navigation system provides a rigid transportation transaction from A to B, and the information shown during this transaction stays uniform no matter what step the user is on. For example, a vehicle representing a driver is typically shown centered on a map traveling along a route or road during the entire trip. However, displaying the same information from a consumer navigation system in the context of ridesharing or courier service causes problems for the user. A ridesharing trip may be from A (where the driver happened to be at dispatch) to B (a temporary pickup point destination) to C (a final drop-off destination). A courier trip may be from A (where the driver happened to be at dispatch) to B (a temporary pickup point destination) to C (another temporary pickup point destination) to D (first drop-off destination) to E (second drop-off destination). When a ridesharing or courier driver is close to a pickup point destination, the driver needs to look for location context clues, to look for a rider, and/or to find a safe place to temporarily pull over. In various conventional navigation systems, irrelevant and noisy information is shown during this moment-such as far away street names or businesses that are inside a building but not visible from the outside. For example, even though a coffee shop inside a supermarket is not visible to the driver, it may still be shown when the driver is attempting the pickup. This driver may be confused when they do not see the coffee shop in front of them as they scan for their rider in the real world.

Example embodiments determine the most helpful information, based on context, to display to the driver at an appropriate time. The pickup or drop-off experience is distinguished from a regular turn-by-turn navigation experience during the middle of the trip (e.g., when the driver is driving to the pickup point or to the drop-off point). As such, a network system identifies a destination (e.g., a pickup point or drop-off point) and determines a corresponding display template that provides a guide for navigation content to be displayed as the driver approaches the destination. The network system determines context associated with an area within a predetermined distance of the destination. The context can include traffic, available exits, no stopping zones, designated pickup zones, visible landmarks and points of interests, and other data that can provide real-time details associated with the destination. End of the route content based on the context is retrieved and an appropriate time for displaying the end of the route content is identified. In various embodiments, the display time is based on a threshold distance to the destination based on the context and/or the corresponding display template. For example, the threshold distance may be 25 meters from a destination for high traffic areas while being 50 meters for a low traffic or residential area. In another example, if the template is for a particular airport, the template may indicate that the end of the route content be displayed within 30 meters of a particular terminal whereby the destination is located at the particular terminal.

FIG. 1 is a diagram illustrating a network environment 100 suitable for providing context related map content at an end of a route to a driver, in accordance with example embodiments. The network environment 100 includes a network system 102 communicatively coupled via a network 104 to a requester device 106a of a user or rider and a service provider device 106b of a service provider or driver (collectively referred to as "user devices 106"). In example embodiments, the network system 102 comprises components that obtain, store, and analyze trip data received from the user devices 106 in order to determine heuristics based on historical trip data. Trip data also includes (substantially) real-time trip data that allows the network system 102 to monitor devices of the users (via sensors in the user devices 106) and detect, for example, if the users are in correct locations for pickup, current locations of the user devices 106, and navigation of users to the destinations (e.g., the pickup points or drop-off points). The network system 102 determines end of the route content to provide to the driver as the driver approaches the destination and determines when to provide the end of the route content (e.g., within a threshold distance of the destination), as discussed in more detail herein. The components of the network system 102 are described in more detail in connection with FIG. 2 and may be implemented in a computer system, as described below with respect to FIG. 5. While some embodiments are described in the context of a transportation service (e.g., to transport a person), example embodiments may also be used in delivery services (e.g., to deliver an item such as food).

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the user devices 106 are portable electronic devices such as smartphones, tablet devices, wearable computing devices (e.g., smartwatches), or similar devices. Alternatively, the service provider device 106b can correspond to an on-board computing system of a vehicle. The user devices 106 each comprises one or more processors, memory, touch screen displays, wireless networking system (e.g., IEEE 802.11), cellular telephony support (e.g., LTE/GSM/UMTS/CDMA/HSDP A), and/or location determination capabilities.

The user devices 106 interact with the network system 102 through a client application 108 stored thereon. The client application 108 of the user devices 106 allow for exchange of information with the network system 102 via user interfaces, as well as in background. For example, the client application 108 running on the user devices 106 may determine and/or provide location information of the user devices 106 (e.g., current location in latitude and longitude), speed, and direction/heading to the network system 102, via the network 104, for analysis and storage. The network system 102 then determines and provides end of the route content to the user devices 106 for display based, in part, on the location information. The end of the route content can then be received and displayed by the user devices 106 as, for example, map and navigation instructions as well as notifications.

In example embodiments, a first user (e.g., a requester or rider) operates the requester device 106a that executes the client application 108 to communicate with the network system 102 to make a request for a transportation service such as transport or delivery service (referred to collectively as a "trip"). The client application 108 determines or allows the user to specify/select a pickup location or point (e.g., of the user or an item to be delivered) and to specify a drop-off location or point for the trip.

A second user (e.g., a service provider or driver) operates the service provider device 106b to execute the client application 108 that communicates with the network system 102 to exchange information associated with providing transportation service (e.g., to the user of the requester device 106a). The client application 108 presents information via user interfaces to the user of the service provider device 106b, such as invitations to provide the transportation service, a route and navigation instructions to a pickup point of the user (e.g., rider) or item, and a route and navigation instructions to a drop-off point for the user or item. The client application 108 also provides data to the network system 102 such as a current location (e.g., coordinates such as latitude and longitude), speed, and/or heading of the service provider device 106b or vehicle.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 5, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of user devices 106 may be embodied within the network environment 100. Furthermore, some components or functions of the network environment 100 may be combined or located elsewhere in the network environment 100. For example, some of the functions of the networked system 102 may be embodied within other systems or devices of the network environment 100. Additionally, some of the functions of the user device 106 may be embodied within the network system 102. While only a single network system 102 is shown, alternative embodiments may contemplate having more than one network system 102 to perform server operations discussed herein for the network system 102.

Figure 2:
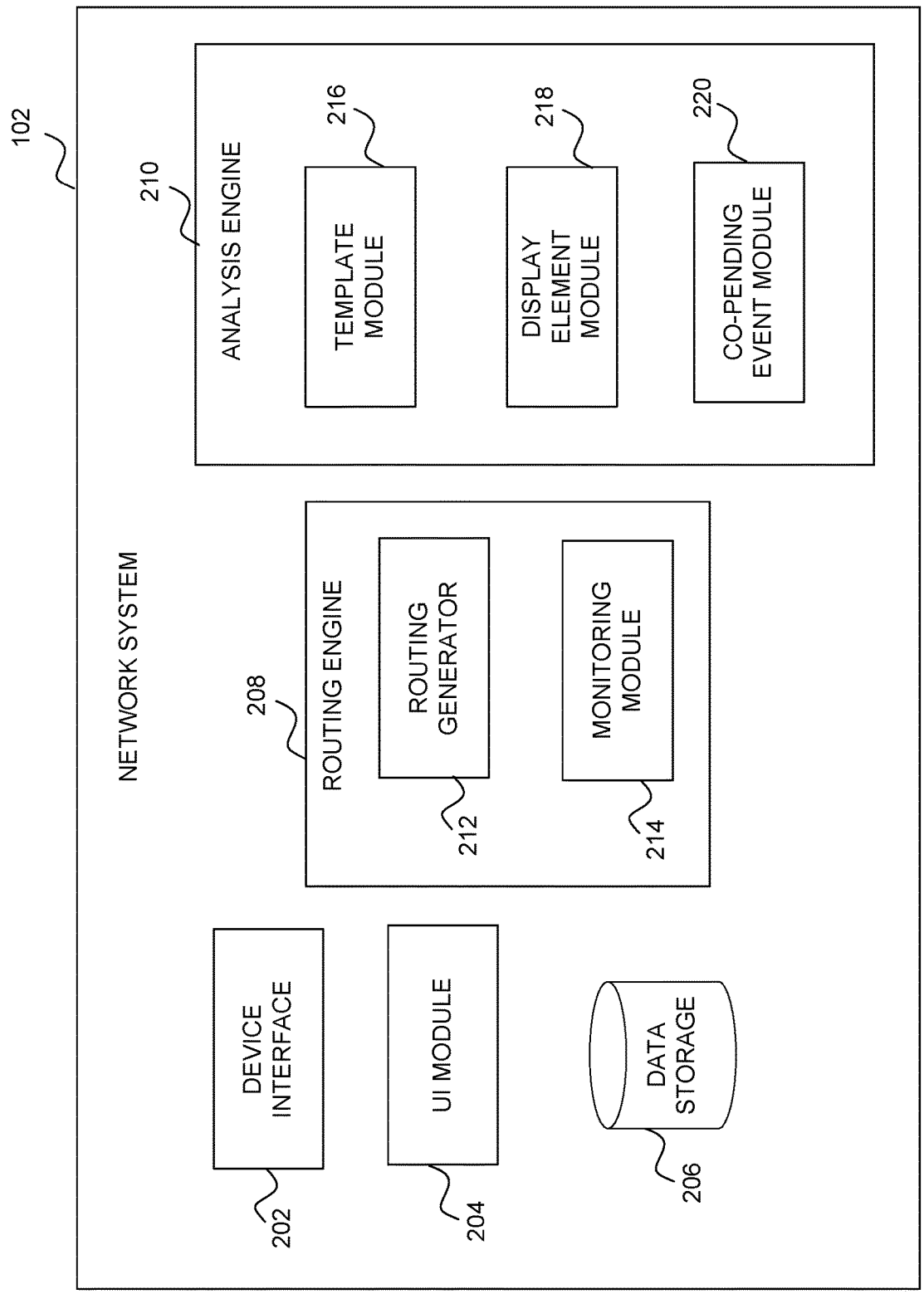
FIG. 2 is a block diagram illustrating components of a network system for providing context related map content at the end of the route, according to some example embodiments.

FIG. 2 is a block diagram illustrating components of the network system 102, according to some example embodiments. In various embodiments, the network system 102 obtains and analyzes trip data (e.g., indicated origin and destination, routes, locations of user devices, speed) received from the user devices 106, determines context associated with an area within a predetermined distance of the destination, determines end of the route content based on the context, and causes presentation of the end of the route content at the user devices (e.g., service provider device 106b). To enable these operations, the network system 102 comprises a device interface 202, a user interface (UI) module 204, a data storage 206, a routing engine 208, and an analysis engine 210 all configured to communicate with each other (e.g., via a bus, shared memory, or a switch). The network system 102 may also comprise other components (not shown) that are not pertinent to example embodiments. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components.

The device interface 202 is configured to exchange data with the client devices 106 and cause presentation of one or more user interfaces provided by the UI module 204 on the client devices 106 (e.g., via the client application 108) including user interfaces to initiate a request for transportation service, select a pickup location and drop-off location, and display a route or path to navigate to the pickup location and the drop-off location. The device interface 202 also receives trip data from the client devices 106 during and after a trip. The trip data can include location information such as GPS traces (e.g., latitude and longitude with timestamp), speed, times associated with each trip, and feedback for the transportation service. The trip data may be received from the client device 106 in real-time as the user is traveling (or navigation to a destination) during the trip. The trip data is stored to the data storage 206 by the device interface 202.

The data storage 206 is configured to store information associated with each user of the network system 102 including the trip data. The stored information includes, for example, past trips, saved or frequently selected destinations (e.g., home, work), and user preferences. In some embodiments, the trip data is stored in or associated with a user profile corresponding to each user and includes a history of interactions using the network system 102. While the data storage 206 is shown to be embodied within the network system 102, alternative embodiments can locate the data storage 206 elsewhere and be communicatively coupled to the network system 102.

The routing engine 208 manages generating routes and monitoring navigation of the routes. To enable these operations, the routing engine 208 comprises a routing generator 212 and a monitoring module 214. The routing engine 208 may comprise other components (not shown) that are not pertinent to example embodiments.

The routing generator 212 is configured to generate routes from an origin to a destination using any route generation systems or algorithms known to those skilled in the art. In example embodiments, the origin is a starting part of the route. Thus, the origin can be a location of the driver when the driver accepts a request to provide transportation service to a rider and the destination is the pickup point of the rider. Further still, a second route can comprise an origin that is the pickup point of the rider (or item to be delivered) and the destination that is the drop-off point of the rider (or the item). In various cases, the generated routes are generated based on being the fastest, shortest, lowest cost, based on user preferences (e.g., avoid freeways, avoid hills, scenic route, frequently driven route), are frequently driven or selected by other users of the network system 102, or selected by the network system 102 based on other reasons or criteria.

The monitoring module 214 monitors navigation of the route to the destination. In example embodiments, the monitoring module 214 may receive location information (e.g., GPS coordinates) from the user device 106 (e.g., service provider device 106b) in substantially real-time. The monitoring module 214 determines whether the location information indicates that the driver is still navigating along the route or if the driver deviated from the route. If the driver deviates from the route, the monitoring module 214 may trigger the routing generator 212 to update the route (e.g., generate a reroute) to the destination. The monitoring module 214 can also determine whether the driver/vehicle is slowing down or stopping at or near the destination. Further still, the monitoring module 214 can determine, based on location information tracked over time, whether the driver/vehicle is in a heavy traffic area.

The analysis engine 210 is configured to determine end of the route content and determine when to show the end of the route content to the driver. More particularly, the analysis engine 210 determines context associated with an area within a predetermined distance of the destination and retrieves the end of the route content based, in part, on the context and a corresponding display template. The end of route content is then presented in accordance with the display template identified by the analysis engine 210. The analysis engine 210 also identifies an appropriate time for displaying the end of the route content. To enable these operations, the analysis engine 210 includes a template module 216, a display element module 218, and a co-pending event module 220.

The template module 216 identifies a display template to be used as a guild (e.g., set of instructions) for presenting the end of the route content. The display template may indicate a view to be displayed at various times during the end of the route. For example, the display template may indicate a field of view as the driver approaches the destination. The display template may also indicate if and when to zoom in and/or pan out and to what level of zoom/pan out.

During most of the route, typically, the vehicle is centered in the view displayed on the service provider device 106b. However, the template can indicate to fix the map and stop scrolling within a threshold distance of the destination and, instead, let the vehicle drive around on the fixed map. With the fixed map, street level views can be displayed to the driver if indicated in the display template, in accordance with one embodiment. For example, if the driver is approaching an airport, the display template can indicate a switch from the usual map display to images of the terminals from a street level view. Here, the driver moves around on the fixed/static map instead of panning and zooming on an interactive map.

In addition to different visual representations that can be shown, the display template may also indicate what data should be shown and hidden at various times. That is, different data is shown at the end of the route versus what is normally shown in the middle of the route. For example, in the middle of the route, granular data such as addresses or points of interests are not shown. However, when the driver is at a predetermined distance to the destination, the display template may indicate that this information be displayed or visually displayed differently. In some embodiments, the display template may indicate to show the street level view or imagery and to overlap data onto that view. As a result, the user interface will allow the driver to look around and see buildings (e.g., as a cartoon or photos) on which data is overlaid on top of (e.g., addresses or name of the building). The display template can also indicate to display more points of interest or indicate the types of points of interest to display and when to start displaying them.

The display template can also indicate to use a cinematic view at the end of the route. The cinematic view is a series of views that are presented to the driver to provide the driver with context of the area and destination. For example, the view may zoom out to show the location of the vehicle and zoom in to show the rider waiting for pickup at their current GPS location. The view can then zoom out to a larger view of the location (e.g., a mall the rider is in). In some cases, the cinematic view is only presented when the monitoring module 214 detects that the driver has stopped (e.g., zero velocity detected) or detects the driver is in certain areas such as a parking lot, waiting area, or white curb (passenger) zone.

Additionally, the display template may indicate that names of businesses that are not visible be hidden. In these embodiments, data structures for landmarks and points of interest provide hierarchy information. For example, the data structure indicates that a building has a particular number of levels and number of exits. The data structure can also indicate what points of interests are within other points of interested. For example, a coffee shop may be located within a grocery store or a restaurant is located within a mall. Further still, the display template can indicate to add more visible points of interests as the driver gets closer to the destination.

Based on the destination identified from the transportation request, the template module 216 determines a corresponding display template that is used as a guide for generating and causing display of the end of the route content as the driver approaches the destination. The various display templates may be generated based on heuristics and stored to the data storage 206 for retrieval during runtime. In retrieving an appropriate display template, the template module 216 determines whether a special zone template exists for the destination (e.g., whether the destination is at a special zone). Special zones typically are structured spaces that may have specifically designated destinations (e.g., pickup points or areas, drop-off points or areas, exits). For example, a special zone may be an airport, mall, casino, or arena. The special zone templates may be defined for a specific special zone (e.g., San Francisco International Airport; Madison Square Garden) or types of special zones (e.g., airports, malls, and casinos).

In example embodiments, the special zone templates have an awareness of a geofence for the special zone and indicate one or more threshold or predetermined distances to the destination in which different content or different views should be provided. Thus, for example, if the destination is the international terminal at the airport, the display template uses a geofence of the international terminal and not for the entire airport which may span multiple terminals over a large area.

If the destination does not involve a special zone or if a special zone template does not exist for the identified special zone, the template module 216 determines whether the destination is in downtown (or urban area) or in a residential (or rural) area. A corresponding core (downtown/urban) template or residential/rural template can then be accessed by the template module 216. The core template may be generic for any urban setting while the residential template may be generic for any residential setting. For instance, the core template may generally indicate display of the end of the route content closer to the destination (e.g., 1 block away), while the residential/rural template may generally use a larger distance from the destination as a trigger for displaying the end of the route content. Additionally, the core template may trigger display of more points of interest around the destination than the residential template.

The display element module 218 determines context associated with an area within a predetermined distance of the destination and determines, based on the display template, what content to show and when to show the content. In some embodiments, the display element module 218 uses the display template as a guide and may complement (or even override) the display template based on the context. As such, the display element module 218 accesses rules based on different context. In some cases, the display templates include the rules. The display element module 218 makes use of the knowledge of the area around the destination, the location of the rider, and dynamic conditions such as traffic or location of the driver to decide on content customized to any of those parameters. The display element module 218 then accesses the end of the route content based on the context and display template and identifies an appropriate time or times (e.g., from the display template) for displaying the end of the route content. It is noted that a series of different content or views may be presented at different times at the end of the route.

In some embodiments, the display time is based on a threshold distance to the destination based on the context and/or based on the corresponding display template that is being used. For example, the threshold distance may be 25 meters from a destination for high traffic area while being 50 meters for a low traffic or residential destination. In another example, if the template is for a particular airport, the template may indicate that the end of the route content be displayed within 30 meters of a particular terminal whereby the destination is located at the particular terminal. However, the threshold distance may be adjusted by the display element module 218 if heavy traffic is detected in the area. For a delivery service embodiment, the display time may be when the service provider is parked and starts to navigate on foot to the destination to pickup or drop-off the item. Alternatively, the display time may be when the service provider is within a threshold distance of a parking location for the destination and the end of the route content includes both content for finding the parking location and content for navigating on foot to the destination.

The display element module 218 identifies and retrieves the content for display based on the context and/or the display template. For instance, an airport template may be accessed by the template module 216 and the display element module 218 determines content for different areas within the airport. For example, for different levels of the airport, the display element module 218 may determine what content applies to a level the destination is located on. In another example, a casino may be a large complex and the display template may indicate to show end of the route content within the last 50 meters of the destination. The display element module 218 determines which exit or pickup zone the rider is waiting at and limits the end of the route content to within 50 meters of that particular exit or pickup zone. Similar with a mall, the display template may indicate that end of the route content displayed within the last 50 meters to a destination, but the mall may have several exits and levels. As such, the display element module 218 identifies the specific exit and corresponding content to display at the display time. In this case, only a portion of the mall near the specific exit may be shown to the driver.

In some cases, the context may override a typical display time or content indicated by the display template. For example, if the display element module 218 detects heavy traffic within an area of the destination, the display element module 218 may cause a zoom in or display of end of the route content later than indicated in the template because the driver is moving slower than anticipated. Additionally, the display element module 218 may show a side of the street the rider is waiting on in order to avoid the driver missing the rider and having to reroute in the high traffic area (and avoid having the rider cross the street in the high traffic area) even though the corresponding display template does typically indicate using this view.

In some cases, the context identified by the display element module 218 is based on time of day. For example, some businesses operate during certain times of the day. When the businesses are closed, information for those business should not be shown to the driver since the driver most likely will not be looking for those business or the businesses cannot be seen (e.g., lights are off and there is no visible signage). For instance, if the trip is occurring at 2 am, the display element module 218 will determine that brunch places or daycares should not be shown but that bars should be shown at the end of the route. Therefore, the display element module 218 can identify different points of interests to show based on the time of day.

In some cases, the display element module 218 determines that the destination is near or at a landmark or point of interest which affects the pickup or drop-off. For example, the destination may be by a bus stop, by a school, or along a no stopping zone. In these cases, the display element module 218 may instruct the UI module 204 to indicate or show the bus stop, school, or no stopping zone on the map and, in some case, visually distinguish these landmarks (e.g., red line/curb, icon with a notification).

Further still, the display element module 218 can determine how much detail should be shown at the end of the route. Some of the details include number of lanes on road, a divider on the road, directionality of the road, class of road (e.g., alley vs. highway), geometry/topology of road (e.g., indicating if a U-turn will be easy), prominence of signage nearby, and sidewalk landmarks (e.g., mailboxes, street lights). In other embodiments, these details are noted in the display template and the display element module 218 just follows the guidance of the display template.

In some embodiments, the display element module 218 applies an algorithm that considers the cost of a missed turn or missed destination in determining what to show and when to show it. For instance, the display element module 218 determines whether missing pickup of a rider will require 30 seconds to fix (e.g., a quick U-turn) or seven minutes to fix (e.g., the driver will need to make 3 right turns or go around the entire airport). Certain navigation moments have a high cost if the driver misses a turn or destination. The display element module 218 can also use this input to choose a particular display mode/view and/or content to display.

The co-pending event module 220 is configured to manage multiple pickups occurring in the same location. For example, an airport may have several riders being picked up at the same time at approximately the same location (e.g., a ride-sharing pickup zone). The co-pending event module 220 detects the multiple pickups of the network system 102 and can provide different content to different users. In one embodiment, the co-pending event module 220 may instruct the UI module 204 to present a notification to the service provider device 106b that indicates that multiple pickups are occurring at the pickup point so the driver should confirm they have the correct rider. In another embodiments, the co-pending event module 220 may provide content to riders to direct them to different landmarks at the pickup point and provide content to their respective drivers indicating at which landmark their rider can be found. For example, a first rider may be instructed to stand by a mailbox and a second rider may be instructed to stand by a bench.

Figure 3:
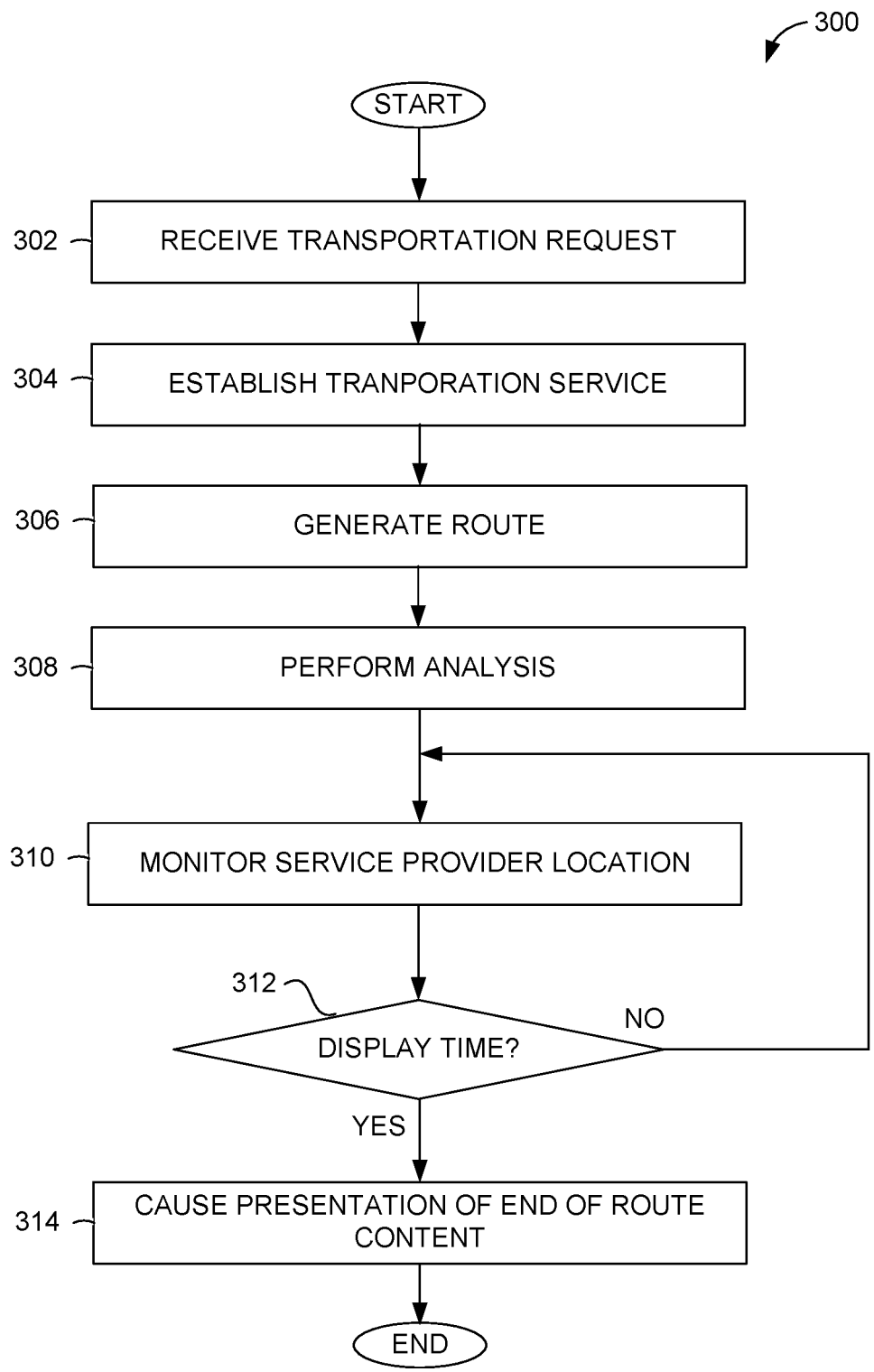
FIG. 3 is a flowchart illustrating operations of a method for causing presentation of context related map content at the end of the route, according to some example embodiments.

FIG. 3 is a flowchart illustrating operations of a method 300 for causing presentation of context related map content at the end of the route, according to some example embodiments. Operations in the method 300 may be performed by the network system 102, using components described above with respect to FIG. 2. Accordingly, the method 300 is described by way of example with reference to the network system 102. However, it shall be appreciated that at least some of the operations of the method 300 may be deployed on various other hardware configurations or be performed by similar components residing elsewhere in the network environment 100. Therefore, the method 300 is not intended to be limited to the network system 102.

In operation 302, the device interface 202 receives a transportation request from the requester device 106a. The transportation request includes an indication of a pickup point and a drop-off point, each of which may be considered a destination.

In operation 304, the routing engine 208 (or a component coupled to the routing engine 208) establishes the transportation service. The transportation service (or trip) is established by assigning the transportation service to a service provider to fulfill the transportation request.

In operation 306, the routing engine 208 (e.g., routing generator 212) generates a navigation route from the service provider's location to the destination. In order to generate the route, the routing engine 208 identifies the destination. In the case where the driver needs to navigate to a pickup point to pick up the rider or an item for delivery, the destination is the pickup point. In the case where the driver has already picked up the rider or item, the destination point is the drop-off point.

In operation 308, the analysis engine 210 performs analysis to determine end of route content and determined when to show the end of route content. Operation 308 will be discussed in more detail in FIG. 4 below.

In operation 310, the monitoring module 214 monitors the location of the service provider. In example embodiments, the monitoring module 214 receives location information (e.g., GPS coordinates) from the service provider device 106b in substantially real-time. The monitoring module 214 can determine where the driver is along the route, whether the driver is still navigating along the route, or if the driver deviated from the route. The monitoring module 214 can also detect if the driver is in a high traffic area or is stopped, driving slowly, or driving fast (e.g., based on velocity/speed).

In operation 312, the display element module 218 (in connection with the monitoring module 214) makes a determination whether the display time has been reached. In example embodiments, the monitoring module 214 identifies where along the navigation route the service provide device 106b (and thus the vehicle) is located. From that location, the display element module 218 can determine whether the driver is within the threshold distance (as determined by the analysis engine 210) to the destination to trigger the display of the end of the route content.

In operation 314, if the display time is reached, the UI module 204 causes presentation of the end of the route content. In some cases, the display element module 218 determines that the destination is near or at a landmark which affects the pickup or drop-off (e.g., by a bus stop, by a school, or along a no stopping zone). In these cases, the display element module 218 may instruct the UI module 204 to indicate or show the landmark on the map and, in some case, visually distinguish these features (e.g., red line, icon with a note) Further still, the display element module 218 (e.g., based in part on a display template and/or context) determines how much detail should be shown at the end of the route. Some of the details include the view(s) presented, number and types of points of interests, number of lanes on road, a divider on the road, directionality of the road, class of road (e.g., alley vs. highway), geometry/topology of road (e.g., indicating if a U-turn will be easy), prominence of signage nearby, and sidewalk landmarks (e.g., mailboxes, street lights). In some embodiments, the display element module 218 applies an algorithm that considers the cost of a missed turn or missed destination. Because certain navigation moments have a high cost if the driver misses a turn or destination, the display element module 218 can also use this input to choose a particular display mode and/or content to display.

While example embodiments discuss causing different displays on a map, some embodiments can provide other (or additional) content. For example, text prompts or other graphics can be provided or overlaid over the map. Additionally, notification pop-ups can be presented. For instance, the notification pop-up may indicate that the rider is the person standing next to the lamppost and not the person standing by the mailbox.

Figure 4:
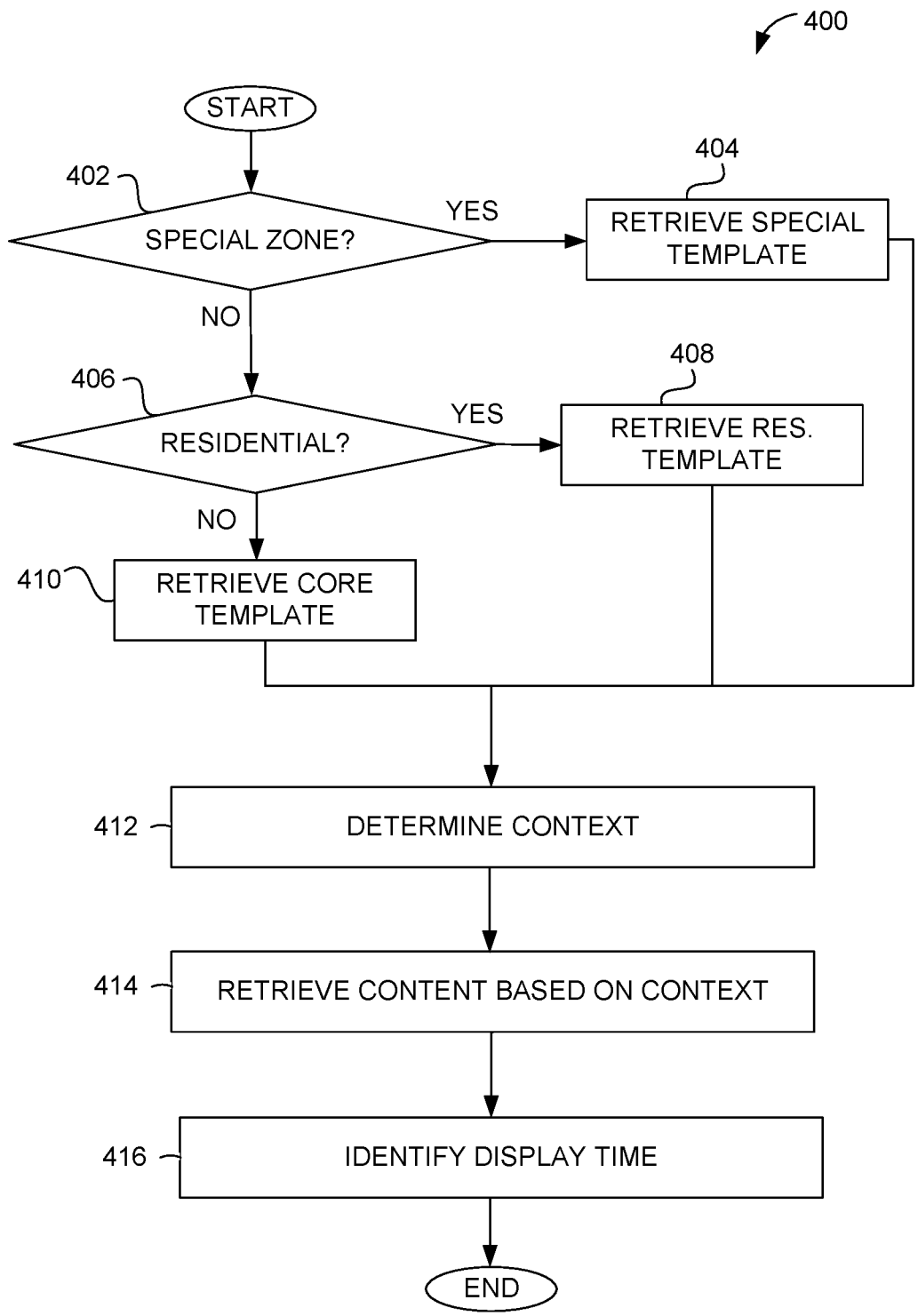
FIG. 4 is a flowchart illustrating operations of a method for performing end of route display content analysis, according to some example embodiments.

FIG. 4 is a flowchart illustrating operations of a method 400 (e.g., operation 308) for performing end of route display content analysis, according to some example embodiments. Operations in the method 400 may be performed by the network system 102 (e.g., analysis engine 210), using components described above with respect to FIG. 2. Accordingly, the method 400 is described by way of example with reference to the network system 102. However, it shall be appreciated that at least some of the operations of the method 400 may be deployed on various other hardware configurations or be performed by similar components residing elsewhere in the network environment 100. Therefore, the method 400 is not intended to be limited to the network system 102.

In operation 402, the template module 216 determines whether the destination corresponds to a special zone. In example embodiments, special zones are areas that have specific templates established for the display of the end of the route content. Examples of special zones include airports, malls/markets, casinos, convention centers, arenas, or any large complexes. Special zones can also include specifically identified zones such as a specific airport (e.g., San Francisco International Airport), specific malls/markets, specific casinos, specific conventions centers, specific arenas (e.g., Madison Square Gardens), or other specific large complexes. If the destination does correspond to a special zone, then the corresponding special zone template is retrieved/accessed by the template module 216 in operation 404.

If the destination does not correspond to a special zone, then the template module 216 determines whether the destination corresponds to a residential (or rural) area. If the destination does correspond to a residential (or rural) area, then the corresponding residential template is retrieved by the template module 216 in operation 408. If the destination does not correspond to a residential (or rural) area, then a core template is retrieved/accessed in operation 410. The core template corresponds to an urban or downtown template in various embodiments.

Each display template is a set of rules/instructions that serves as guidelines for determining what content to be displayed at the end of the route and when to display the content. The display template may indicate a field of view as the driver approaches the destination and includes instructions on if and when to zoom in or pan out. In addition to different visual representations that are shown, the display template may also indicate what data should be shown and hidden at various times. That is different data is shown at the end of the route versus what is normally shown in the middle of the route. For example, when the driver is at a threshold distance to the destination, the display template may indicate that different content be displayed or visually displayed differently. In some cases, the template may indicate to show the street level view or imagery and to overlap data onto that view. The display template can also indicate whether and when to use a cinematic view at the end of the route. Additionally, the display template may indicate that names of businesses that are not visible be hidden. Further still, the display template can add more visible points of interests as the driver gets closer to the destination.

In operation 412, the display element module 218 determines context associated with an area within a predetermined distance of the destination and determines what content to show and when to show the content based in part on the display template. The context can include traffic, available exits, no stopping zones, designated pickup zones, visible landmarks and points of interests, and other data that can provide real-time details associated with the destination.

In operation 414, the display element module 218 retrieves/accesses content based on the context and display template and identifies a display time in operation 416. In various embodiments, the display time is based on a threshold distance to the destination based on the context and/or the corresponding display template. For example, the threshold distance may be 25 meters from a destination for high traffic areas while being 50 meters for a low traffic or residential area. In another example, if the template is for a particular airport, the template may indicate that the end of the route content be displayed within 30 meters of a particular terminal whereby the destination is located at the particular terminal.

In some cases, the display element module 218 can access or includes rules based on different context which can override or complement the guidelines in the display template that is being used. The display element module 218 makes use of the knowledge of the location, rider, and dynamic conditions such as traffic and time of data to decide on content customized to any of those parameters. It is noted that operations 412-416 may occur in a different order or simultaneously in various embodiments.

In some cases, the context may trigger a different display time or different set of content than normally indicated by the display template. For example, if the display element module 218 detects heavy traffic within an area of the destination, the display element module 218 may cause a zoom in or display of end of the route content later than indicated in the display template because the driver is moving slower than anticipated. In another example, when an airport template may be used, the display element module 218 may determine content for different areas within the airport. For example, for different levels of the airport, the display element module 218 may determine what content applies to the level the destination is located on. In another example, a casino may be a large complex and the display element module 218 may determine which exit or pickup zone the rider is waiting at and limits the end of the route content to within a threshold distance of that particular exit or pickup zone. As such, the display element module 218 complements the display template by identifying the specific exit and corresponding content to display at the display time.

In some cases, the context identified by the display element module 218 is based on time of day. As a result, the display element module 218 identifies different points of interested to show based on the time of day. For example, when businesses are closed, information for those business should not be shown to the driver since the driver most likely will not be looking for those businesses. For instance, if the trip is occurring at 8 am on a weekday, the display element module 218 will determine that schools and daycares should be shown, but that bars should not be shown at the end of the route.

The display element module 218 then accesses the end of the route content based on the context (operation 414) and identifies an appropriate time for displaying the end of the route content (operation 416). In some embodiments, the display time is based on a threshold distance to the destination based on the context or based on the guidelines in the corresponding display template that is being used. For example, the threshold distance may be 25 meters from a destination for high traffic areas while being 50 meters for a low traffic or residential areas.

Figure 5:
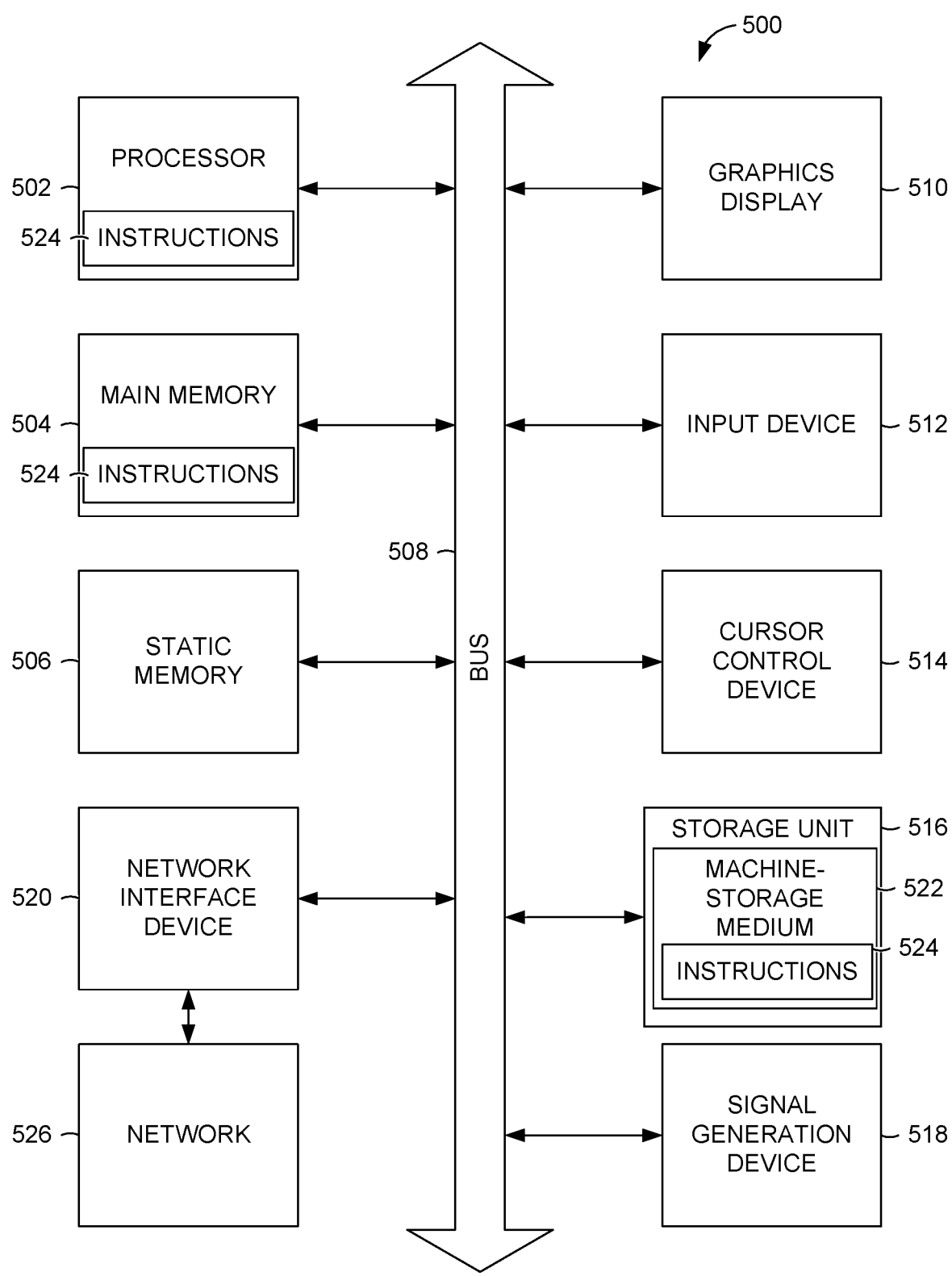
FIG. 5 is a block diagram illustrating components of a machine, according to some example embodiments, able to read instructions from a machine-storage medium and perform any one or more of the methodologies discussed herein.

FIG. 5 illustrates components of a machine 500, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 5 shows a diagrammatic representation of the machine 500 in the example form of a computer device (e.g., a computer) and within which instructions 524 (e.g., software, a program, an application, an applet, an app, or other executable code) for causing the machine 500 to perform any one or more of the methodologies discussed herein may be executed, in whole or in part.

For example, the instructions 524 may cause the machine 500 to execute the flow diagrams of FIGS. 3 and 4. In one embodiment, the instructions 524 can transform the general, non-programmed machine 500 into a particular machine (e.g., specially configured machine) programmed to carry out the described and illustrated functions in the manner described.

In alternative embodiments, the machine 500 operates as a standalone device or may be connected (e.g., networked) to other machines. In a networked deployment, the machine 500 may operate in the capacity of a server machine or a client machine in a server-client network environment, or as a peer machine in a peer-to-peer (or distributed) network environment. The machine 500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 524 (sequentially or otherwise) that specify actions to be taken by that machine. Further, while only a single machine is illustrated, the term "machine" shall also be taken to include a collection of machines that individually or jointly execute the instructions 524 to perform any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The processor 502 may contain microcircuits that are configurable, temporarily or permanently, by some or all of the instructions 524 such that the processor 502 is configurable to perform any one or more of the methodologies described herein, in whole or in part. For example, a set of one or more microcircuits of the processor 502 may be configurable to execute one or more modules (e.g., software modules) described herein.

The machine 500 may further include a graphics display 510 (e.g., a plasma display panel (PDP), a light emitting diode (LED) display, a liquid crystal display (LCD), a projector, or a cathode ray tube (CRT), or any other display capable of displaying graphics or video). The machine 500 may also include an input device 512 (e.g., a keyboard), a cursor control device 514 (e.g., a mouse, a touchpad, a trackball, a joystick, a motion sensor, or other pointing instrument), a storage unit 516, a signal generation device 518 (e.g., a sound card, an amplifier, a speaker, a headphone jack, or any suitable combination thereof), and a network interface device 520.

The storage unit 516 includes a machine-storage medium 522 (e.g., a tangible machine-storage medium) on which is stored the instructions 524 (e.g., software) embodying any one or more of the methodologies or functions described herein. The instructions 524 may also reside, completely or at least partially, within the main memory 504, within the processor 502 (e.g., within the processor's cache memory), or both, before or during execution thereof by the machine 500. Accordingly, the main memory 504 and the processor 502 may be considered as machine-storage media (e.g., tangible and non-transitory machine-storage media). The instructions 524 may be transmitted or received over a network 526 via the network interface device 520.

In some example embodiments, the machine 500 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 504, 506, and/or memory of the processor(s) 502) and/or storage unit 516 may store one or more sets of instructions and data structures (e.g., software) 524 embodying or utilized by any one or more of the methodologies or functions described herein. These instructions, when executed by processor(s) 502 cause various operations to implement the disclosed embodiments.

As used herein, the terms "machine-storage medium," "device-storage medium," "computer-storage medium" (referred to collectively as "machine-storage medium 522") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 522 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 522 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 524 may further be transmitted or received over a communications network 526 using a transmission medium via the network interface device 520 and utilizing any one of a number of well-known transfer protocols (e.g., HTTP). Examples of communication networks 526 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 524 for execution by the machine 500, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for providing end of route navigation. The method comprises identifying a destination of a route; retrieving a display template based on the destination, the display template providing guidelines for display of end of route content, the display of the end of the route content being different than display of content during a middle of the route; identifying, based on the display template, a display time to trigger the display of the end of the route content, the display time being associated with a threshold distance to the destination; monitoring, by a hardware processor, a location of a vehicle along the route; accessing end of route content; and responsive to detecting that the location of the vehicle is at the threshold distance to the destination, causing presentation of the end of the route content on a device associated with the vehicle.

In example 2, the subject matter of example 1 can optionally include determining a context of an area within a predetermined distance of the destination, the end of route content being based in part on the context.

In example 3, the subject matter of any of examples 1-2 can optionally include wherein the determining the context comprises determining a level of traffic in the area within the predetermined distance of the destination; and the identifying the display time is based in part on the level of the traffic.

In example 4, the subject matter of any of examples 1-3 can optionally include wherein the determining the context comprises determining a time of day, and the method further comprises determining points of interests to display at the end of the route based on the time of day.

In example 5, the subject matter of any of examples 1-4 can optionally include wherein the display template comprises a special zone template that provides guidelines for display of the end of the route content for a specific type of structured complex.

In example 6, the subject matter of any of examples 1-5 can optionally include wherein the display template indicates a type of view to provide at the end of the route, the type of view being selected from a cinematic view, a street level view, and a partial view of a structured complex.

In example 7, the subject matter of any of examples 1-6 can optionally include wherein the display template indicates a number and types of points of interest and landmarks to display at the end of the route.

In example 8, the subject matter of any of examples 1-7 can optionally include detecting more than one pickup occurring at the destination; identifying different landmarks at the destination; causing presentation of a first notification to a device of a requester to move to a specific landmark; and causing presentation of a second notification to the device of the service provider indicating to pick up the requester at the specific landmark.

Example 9 is a system for providing end of route navigation. The system includes one or more processors and a storage medium storing instructions that, when executed by the one or more hardware processors, causes the one or more hardware processors to perform operations comprising identifying a destination of a route; retrieving a display template based on the destination, the display template providing guidelines for display of end of route content, the display of the end of the route content being different than display of content during a middle of the route; identifying, based on the display template, a display time to trigger the display of the end of the route content, the display time being associated with a threshold distance to the destination; monitoring a location of a vehicle along the route; accessing end of route content; and responsive to detecting that the location of the vehicle is at the threshold distance to the destination, causing presentation of the end of the route content on a device associated with the vehicle.

In example 10, the subject matter of example 9 can optionally include wherein the operations further comprise determining a context of an area within a predetermined distance of the destination, the end of route content being based in part on the context.

In example 11, the subject matter of any of examples 9-10 can optionally include wherein the determining the context comprises determining a level of traffic in the area within the predetermined distance of the destination; and the identifying the display time is based in part on the level of the traffic.

In example 12, the subject matter of any of examples 9-11 can optionally include wherein the determining the context comprises determining a time of day, and the operations further comprise determining points of interests to display at the end of the route based on the time of day.

In example 13, the subject matter of any of examples 9-12 can optionally include wherein the display template comprises a special zone template that provides guidelines for display of the end of the route content for a specific type of structured complex.

In example 14, the subject matter of any of examples 9-13 can optionally include wherein the display template indicates a type of view to provide at the end of the route, the type of view being selected from a cinematic view, a street level view, and a partial view of a structured complex.

In example 15, the subject matter of any of examples 9-14 can optionally include wherein the display template indicates a number and types of points of interest and landmarks to display at the end of the route.

In example 16, the subject matter of any of examples 9-15 can optionally include wherein the operations further comprise detecting more than one pickup occurring at the destination; identifying different landmarks at the destination; causing presentation of a first notification to a device of a requester to move to a specific landmark; and causing presentation of a second notification to the device of the service provider indicating to pick up the requester at the specific landmark.

Example 17 is a machine-storage medium storing instructions for providing end of route navigation. The instructions configures one or more processors to perform operations comprising identifying a destination of a route; retrieving a display template based on the destination, the display template providing guidelines for display of end of route content, the display of the end of the route content being different than display of content during a middle of the route; identifying, based on the display template, a display time to trigger the display of the end of the route content, the display time being associated with a threshold distance to the destination; monitoring a location of a vehicle along the route; accessing end of route content; and responsive to detecting that the location of the vehicle is at the threshold distance to the destination, causing presentation of the end of the route content on a device associated with the vehicle.

In example 18, the subject matter of example 17 can optionally include wherein the operations further comprise determining a context of an area within a predetermined distance of the destination, the end of route content being based in part on the context.

In example 19, the subject matter of any of examples 17-18 can optionally include wherein the display template comprises a special zone template that provides guidelines for display of the end of the route content for a specific type of structured complex.

In example 20, the subject matter of any of examples 17-19 can optionally include wherein the operations further comprise detecting more than one pickup occurring at the destination; identifying different landmarks at the destination; causing presentation of a first notification to a device of a requester to move to a specific landmark; and causing presentation of a second notification to the device of the service provider indicating to pick up the requester at the specific landmark.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   identifying a destination of a route;
   based on the destination, determining a corresponding display template from a plurality of display templates that each corresponds to a different destination or type of destination, each display template comprises a different set of rules that serves as a guideline for determining what content to display at the end of the route and when to display the end of the route content, the display of the end of the route content being different than display of content during a middle of the route, the determining the corresponding display template comprising:
      identifying a special zone template based on the destination being a special zone, the special zone template providing guidelines for display of the end of the route content for a specific type of structured complex that has a specifically designated pickup area, a specifically designated drop-off area, or specifically designated exits;
      identifying a residential template based on the destination not being a special zone and the destination corresponding to a residential area; or
      identifying a core template based on the destination not being a special zone and not corresponding to the residential area;
   retrieving the corresponding display template that corresponds to the destination from a data storage that stores the plurality of display templates;
   identifying, from a rule of the corresponding display template, a display time to trigger the display of the end of the route content, the display time being based on a threshold distance to the destination;
   monitoring, by a hardware processor, a location of a vehicle along the route,
   determining a context of an area within a predetermined distance of the destination, the context comprising one or more real-time details associated with the destination;
   based on the context of the area, overriding the display time or content indicated by the set of rules of the display template for display as the end of the route content;
   based on the context of the area and the display template, accessing the end of the route content; and
   causing presentation of the end of the route content on a device of a service provider based on the context of the area and the display template.

2. The method of claim 1, further comprising:
   applying an algorithm that considers cost of a missed turn or destination, wherein the overriding the display time or the content indicated by the set of rules is based on a result of the algorithm.

3. The method of claim 1, wherein:
   the context comprises a level of traffic in the area within the predetermined distance of the destination; and
   the overriding the display time is based in part on the level of the traffic.

4. The method of claim 1, wherein;
   the context comprises a time of day, and
   the method further comprises determining points of interests to display and points of interests that are closed and are not to be displayed at the end of the route based on the time of day.

5. The method of claim 1, wherein the special zone template uses a geofence for a portion of the special zone in providing the end of the route content.

6. The method of claim 1, wherein the corresponding display template indicates a type of view to provide at one or more times during the end of the route, the type of view being selected from a cinematic view, a street level view, and a partial view of a structured complex.

7. The method of claim 1, wherein the corresponding display template indicates a number and types of points of interest and landmarks to display at the end of the route and what data should be shown and hidden at various times at the end of the route.

8. The method of claim 1, further comprising:
   detecting more than one pickup occurring at the destination;
   based on the detecting more than one pickup occurring at the destination:
      identifying different landmarks at the destination;
      causing presentation of a first notification to a device of a first requester to move to a first specific landmark and a second notification to a device of a second requester to move to a second specific landmark; and
      causing presentation of a third notification to the device of the service provider indicating that multiple pickups are occurring at the destination and to pick up the first requester at the first specific landmark and a fourth notification to a device of a further service provider indicating that multiple pickups are occurring at the destination and to pick up the second requester at the second specific landmark.

9. A system comprising:
   one or more hardware processors; and
   a storage medium storing instructions that, when executed by the one or more hardware processors, cause the one or more hardware processors to perform operations comprising:
      identifying a destination of a route;
      based on the destination, determining a corresponding display template from a plurality of display templates that each corresponds to a different destination or type of destination, each display template comprises a different set of rules that serves as a guideline for determining what content to display at the end of route and when to display the end of the route content, the display of the end of the route content being different than display of content during a middle of the route, the determining the corresponding display template comprising:
         identifying a special zone template based on the destination being a special zone, the special zone template providing guidelines for display of the end of the route content for a specific type of structured complex that has a specifically designated pickup area, a specifically designated drop-off area, or specifically designated exits;
         identifying a residential template based on the destination not being a special zone and the destination corresponding to a residential area; or
         identifying a core template based on the destination not being a special zone and not corresponding to the residential area,
      retrieving the corresponding display template that corresponds to the destination from a data storage that stores the plurality of display templates;
      identifying, from a rule of the corresponding display template, a display time to trigger the display of the end of the route content, the display time being based on a threshold distance to the destination;

monitoring a location of a vehicle along the route;

determining a context of an area within a predetermined distance of the destination, the context comprising one or more real-time details associated with the destination;

based on the context of the area, overriding the display time or content indicated by the set of rules of the display template for display as the end of route content;

based on the context of the area and the display template, accessing the end of route content; and causing presentation, of the end of the route content on a device of a service provider based on the context of the area and the display template.

10. The system of claim 9, wherein the operations further comprise applying an algorithm that considers cost of a missed turn or destination, wherein the overriding the display time or the content indicated by the set of rules is based on a result of the algorithm.

11. The system of claim 9, wherein:
the context comprises a level of traffic in the area within the predetermined distance of the destination; and
the overriding the display time is based in part on the level of the traffic.

12. The system of claim 9, wherein:
the context comprises a time of day, and
the operations further comprise determining points of interests to display and points of interests that are closed and are not to be displayed at the end of the route based on the time of day.

13. The system of claim 9, wherein the corresponding display template indicates a type of view to provide at one or more times during the end of the route, the type of view being selected from a cinematic view, a street level view, and a partial view of a structured complex.

14. The system of claim 9, wherein the corresponding display template indicates a number and types of points of interest and landmarks to display at the end of the route.

15. The system of claim 9, wherein the operations further comprise:
detecting more than one pickup occurring at the destination;
identifying different landmarks at the destination;
causing presentation of a first notification to a device of a requester to move to a specific landmark; and
causing presentation of a second notification to the device of the service provider indicating to pick up the requester at the specific landmark.

16. A machine-storage medium storing instructions that, when executed by one or more processors of a machine, cause the machine to perform operations comprising:
identifying a destination of a route;
based on the destination, determining a corresponding display template from a plurality of display templates that each corresponds to a different destination or type of destination, each display template comprises a different set of rules that serves as a guideline for determining what content to display at the end of the route and when to display the end of the route content, the display of the end of the route content being different than display of content during a middle of the route, the determining the corresponding display template comprising:
identifying a special zone template based on the destination being a special zone, the special zone template providing guidelines for display of the end of the route content for a specific type of structured complex that has a specifically designated pickup area, a specifically designated drop-off area, or specifically designated exits;
identifying a residential template based on the destination not being a special zone and the destination corresponding to a residential area; or
identifying a core template based on the destination not being a special zone and not corresponding to the residential area;

retrieving the corresponding display template that corresponds to the destination from a data storage that stores the plurality of display templates;

identifying, from a rule of the corresponding display template, a display time to trigger the display of the end of the route content, the display time being based on a threshold distance to the destination;

monitoring a location of a vehicle along the route;

determining a context of an area within a predetermined distance of the destination, the context comprising one or more real-time details associated with the destination;

based on the context of the area, overriding the display time or content indicated by the set of rules of the display template for display as the end of route content;

based on the context of the area and the display template, accessing the end of route content; and causing presentation of the end of the route content on a device of a service provider based on the context of the area and the display template.

17. The machine-storage medium of claim 16, wherein the operations further comprise:
applying an algorithm that considers cost of a missed turn or destination, wherein the overriding the display time or the content indicated by the set of rules is based on a result of the algorithm.

18. The machine-storage medium of claim 16, wherein the special zone template uses a geofence for a portion of the special zone in providing the end of the route content.

19. The machine-storage medium of claim 16, wherein the operations further comprise:
detecting more than one pickup occurring at the destination;
identifying different landmarks at the destination;
causing presentation of a first notification to a device of a requester to move to a specific landmark; and
causing presentation of a second notification to the device of the service provider indicating to pick up the requester at the specific landmark.

20. The method of claim 1, wherein the corresponding display template provides rules for when to zoom in or pan out and what the level of zoom in or pan out should be during the end of the route.

* * * * *